United States Patent [19]

Hong

[11] Patent Number: 5,733,680
[45] Date of Patent: Mar. 31, 1998

[54] METHOD FOR MAKING HYDRIDE ELECTRODES AND HYDRIDE BATTERIES SUITABLE FOR VARIOUS TEMPERATURES

[76] Inventor: Kuochih Hong, 1790 Rollingwoods, Troy, Mich. 48098

[21] Appl. No.: 553,756

[22] Filed: Oct. 23, 1995

Related U.S. Application Data

[63] Continuation-in-part of Ser. No. 189,080, Jan. 28, 1994, Pat. No. 5,501,917, and Ser. No. 212,354, Mar. 14, 1994, Pat. No. 5,541,017.

[51] Int. Cl.⁶ ................................................... H01M 4/38
[52] U.S. Cl. ........................ 429/101; 429/59; 29/623.1; 420/900
[58] Field of Search .......................... 429/59, 101, 218, 429/224, 220, 219, 223; 29/632.1, 623.5; 420/455, 900; 423/644

[56] References Cited

U.S. PATENT DOCUMENTS

| | | |
|---|---|---|
| 3,660,082 | 5/1972 | Negishi et al. . |
| 4,160,014 | 7/1979 | Gamo et al. . |
| 4,195,989 | 4/1980 | Gamo et al. . |
| 4,370,163 | 1/1983 | Moriwaki et al. . |
| 4,431,561 | 2/1984 | Orshisky et al. . |
| 4,440,736 | 4/1984 | MacLand et al. . |
| 4,457,891 | 7/1984 | Bernauer et al. . |
| 4,551,400 | 11/1985 | Sapru et al. . |
| 4,623,597 | 11/1986 | Sapru et al. . |
| 4,716,088 | 12/1987 | Reichman et al. . |
| 4,728,586 | 3/1988 | Vanketesan et al. . |
| 4,849,205 | 7/1989 | Hong . |
| 4,946,646 | 8/1990 | Gamo et al. . |
| 5,006,328 | 4/1991 | Hong . |
| 5,096,667 | 3/1992 | Fetcenko et al. . |
| 5,104,617 | 4/1992 | Fetcenko et al. . |
| 5,238,756 | 8/1993 | Fetcenko . |
| 5,242,656 | 9/1993 | Zhang et al. . |

Primary Examiner—M. Nuzzolillo

[57] ABSTRACT

This invention provides a method to make a hydrogen storage hydride electrode and a hydride battery, particularly a sealed type, suitable for various temperatures. The battery, according to this invention, is composed of a container, a positive electrode, a negative electrode suitable for various temperatures comprising of at least two hydrogen storage electrode materials and/or their hydrides, a separator positioned between the positive and negative electrodes, and an electrolyte in the container and in contact with the positive and negative electrodes and the separator. The negative electrode is a hydrogen storage hydride electrode which is composed of at least two hydrogen storage electrode alloys having compositions represented by $A_a B_b C_c \ldots$ and $A'_{a'} B'_{b'} C'_{c'} \ldots$ respectively; where the set of elements: A, B, C, ... and the set of elements: A', B', C', ..., both are consisting of 6 to 80 at. % of nickel, preferably 24–55 at. % nickel; and at least four other elements chosen from the group consisting of Mg, Ti, V, Cr, Mn, Fe, Co, Ni, Cu, Al, Y, Zr, Nb, Pd, Ag, Mo, Ca, Si, C, Cu, Ta, Ca, rare earth metals, B, Hf, Sc, Zn, Sb, W, Sn, N, O, Ge, Ga, the alkali metals, P, and S; the sets of atomic mole ratio a, b, c ... and a', b', c', ... are defined by the heat of hydride formation $H_h$ and $H'_h$ respectively; where $H_h$ and $H'_h$ are in a range of between −2.85 and −10.50 Kcal/mole H, preferably between −3.85 and −8.50 Kcal/mole H; the difference between the heat of hydride formation $H_h$ and $H'_h$ being in the range between 0.1 and 5.0 Kcal/mole H, preferably between 1.0 and 3.0 Kcal/mole H.

14 Claims, No Drawings

METHOD FOR MAKING HYDRIDE ELECTRODES AND HYDRIDE BATTERIES SUITABLE FOR VARIOUS TEMPERATURES

CROSS-REFERENCE TO RELATED APPLICATIONS

This application is a continuation in part application of application Ser. No. 08/189,080, filed on Jan. 28, 1994, and Ser. No. 08/212,354 filed on Mar. 14, 1994, now U.S. Pat. Nos. 5,501,917 and 5,541,017 respectively.

BACKGROUND OF THE INVENTION

1. Field of the Invention

This invention relates to a method to determine a multi-component alloys for uses in hydrogen storage, and rechargeable hydrogen storage electrode applications. More specifically, this invention relates to a method to make rechargeable hydride electrodes and batteries suitable for various temperatures.

2. The Related Art

There are numerous researchers reporting hydrogen storage electrode materials for electrochemical applications. These researchers include Sapru et. al. in U.S. Pat. No. 4,551,400, Rechman et al. in U.S. Pat. No. 4,716,088, Venkatesan et al. in U.S. Pat. No. 4,728,586, Hong in U.S. Pat. Nos. 4,849,205 and 5,006,328, Fetcenko et al. in U.S. Pat. Nos. 5,096,667, 5,104,617 and 5,238,756. Gamo et al in U.S. Pat. No. 4,946,646. These U.S. patents, except Hong, fail to teach a method to develop or optimize hydrogen storage electrode materials. Hong in U.S. Pat. Nos. 4,849,205 and 5,006,328 provides a method to develop an alloy for hydrogen storage and hydride electrode applications.

All the aforementioned prior arts only teach the use of a single hydrogen storage material for a hydride electrode or for a hydride battery. In the hydrogen storage hydride technology, it is well known that the hydrogen storage capacity of a hydrogen storage material depends on the temperature and the applied hydrogen pressure. Therefore, at a given hydrogen pressure there is no single hydrogen storage material that can have a stable hydrogen storage capacity over a range of temperatures. As a result, a hydride electrode and battery made will have a much higher internal pressure and a lower capacity as temperature increases. On the other hand, this kind of hydride electrode and battery also will have a lower capacity at lower temperatures due to poor kinetics. Consequently, the electrode or battery made is not suitable for various temperatures.

To solve the problems, the present invention provides, through the application of thermodynamics, kinetics and electrochemistry, a method to select multicomponent alloys suitable for rechargeable hydrogen storage electrode and hydride battery suitable for various temperatures.

SUMMARY OF THE INVENTION

This invention provides a method to make a hydrogen storage hydride electrode and a hydride battery suitable for various temperatures.

The battery, according to this invention, is composed of a container, a positive electrode, a negative electrode suitable for various temperatures comprising of at least two hydrogen storage electrode materials and/or their hydrides, a separator positioned between the positive and negative electrodes, and an electrolyte in the container and in contact with the positive and negative electrodes and the separator.

The positive electrode is composed of a body of a metal oxide, preferably nickel oxide. The separator is composed of a body selected from nylon, polypropylene, and polysulfone. The electrolyte is composed of an alkaline solution. The container is made of either metal or plastic material.

The negative electrode is a hydrogen storage hydride electrode which is composed of at least two hydrogen storage electrode alloys having compositions represented by $A_aB_bC_c \ldots$ and $A'_aB'_bC'_c \ldots$ respectively; where the set of elements: A, B, C . . . and the set of elements: A', B', C', . . . both are including nickel, and at least four other elements chosen from the group consisting of Mg, Ti, V, Cr, Mn, Fe, Co, Ni, Cu, Al, Y, Zr, Nb, Pd, Ag, Mo, Ca, Si, C, Cu, Ta, Ca, rare earth metals, B, Hf, Sc, Zn, Sb, W, Sn, N, O, Ge, Ga, the alkali metals, P, and S; the sets of atomic mole ratio a, b, c . . . and a', b', c', . . . are defined by the heat of hydride formation given below; though it is not necessary, it is desirable to normalize the sum of the atomic mole ratios: $a+b+c+ \ldots$ and $a'+b'+c'+ \ldots$ to be equal to 1;

where the compositions represented by $A_aB_bC_c \ldots$ and $A'_aB'_bC'_c \ldots$ consisting of 6 to 80 at. % of nickel, preferably 24–55 at. % nickel;

where the aforementioned hydrogen storage electrode alloys having compositions represented by $A_aB_bC_c \ldots$ and $A'_aB'_bC'_c \ldots$ having the heats of hydride formation $H_h$ and $H'_h$ respectively; where $H_h$ and $H'_h$ are in a range of between −2.85 and −10.50 Kcal/mole H, preferably between −3.85 and −8.50 Kcal/mole H; and where the heats of hydride formation: $H_h$ and $H'_h$ are defined by:

$$H_h = (aH_h(A) + bH_h(B) + cH_h(C) + \ldots)/(a+b+c+ \ldots) + K \quad (1)$$

$$H'_h = (a'H_h(A') + b'H_h(B') + c'H_h(C') + \ldots)/(a'+b'+c'+ \ldots) + K' \quad (2)$$

where $H_h(A)$, $H_h(B)$, $H_h(C)$, . . . are the heat of hydride formation of the elements A, B, C . . . in units of Kcal/mole H, respectively; and where $H_h(A')$, $H_h(B')$, $H_h(C')$ . . . are the heat of hydride formation of the elements A', B', C', . . . , in units of Kcal/mole H, respectively; where the heat of hydride formation of the elements in units of Kcal/mole H, is given as: $H_h(Mg)=-9.0$, $H_h(Ti)=-15.0$, $H_h(V)=-7.0$, $H_h(Cr)=-1.81$, $H_h(Mn)=-2.0$, $H_h(Fe)=4.0$, $H_h(Co)=3.5$, $H_h(Ni)=1.8$, $H_h(Al)=-1.38$, $H_h(Y)=-27$, $H_h(Zr)=-19.5$, $H_h(Nb)=-9.0$, $H_h(Pd)=-4.0$, $H_h(Mo)=-1.0$, $H_h(Ca)=-21.0$, $H_h(Si)=-1.0$, $H_h(C)=-1.0$, $H_h(Cu)=2.0$, $H_h(Ta)=-10.0$, $H_h(\text{rare earth metals})=-27.0$, $H_h(Li)=-21.0$, $H_h(Na)=-13.4$, $H_h(K)=-13.7$, $H_h(Rb)=-12.5$, $H_h(B)=2.83$, $H_h(Sn)=2.05$, $H_h(Sb)=5.5$, $H_h(Hf)=-20.2$, $H_h(Sc)=-28.9$, $H_h(Zn)=-1.2$, $H_h(Ag)=1.0$, $H_h(S)=-1.0$, $H_h(N)=-0.5$, $H_h(W)=-0.50$, and $H_h(P)=-0.30$; where K is a constant having values of 0.5, −0.2, and −1.5 Kcal/mole H for $a+b+c+ \ldots$ equal to 2, 3, and 6 respectively, and having the value zero for $a+b+c+ \ldots$ not equal to 2, 3 and 6; and where K' is a constant having values of 0.5, −0.2, and −1.5 Kcal/mole H for $a'+b'+c'+ \ldots$ equal to 2, 3, and 6 respectively, and having the value zero for $a'+b'+c'+ \ldots$ not equal to 2, 3 and 6: and where the difference between the absolute values of the heat of hydride formation $H_h$ and $H'_h$ of the alloys, $A_aB_bC_c \ldots$ and $A'_aB'_bC'_c \ldots$ being in the range between 0.10 and 5.0 Kcal/mole H, preferably between 1.0 and 3.0 Kcal/mole H.

It is the major objective of the present invention to provide a hydride battery, specifically a sealed type, using the aforementioned improved hydrogen storage hydride electrode as the negative electrode, wherein as a consequence, the battery so made is suitable for various temperatures.

The advantages, features and other objects of the present invention will become clear from the following detailed description.

DETAILED DESCRIPTION OF THE INVENTION

It is the major objective of the present invention to provide an improved hydrogen storage hydride electrode as the negative electrode suitable for various temperatures. Specifically, the major objective of the present invention is to provide a hydride battery, in particular, a sealed type, nickel-hydride battery suitable for various temperatures.

In a nickel-hydride battery, the electrochemical reactions are as follows: At the positive electrode (Nickel electrode):

$$Ni(OH)_2 + OH^- \underset{discharge}{\overset{charge}{\rightleftarrows}} NiOOH + H_2O + e^- \quad (3)$$

At the negative electrode (hydride electrode):

$$M + xH_2O + xe^- \underset{discharge}{\overset{charge}{\rightleftarrows}} MH_x + xOH^- \quad (4)$$

where M and $MH_x$ are the hydrogen storage material and its hydride, respectively. The hydride in Equ. (4) is related to hydrogen equilibrium pressure shown in Equ. (5):

$$MH_x \rightleftarrows M + x/2\, H_2 \quad (5)$$

The hydrogen equilibrium pressure, $P(H_2)$, of the hydride former M at a given H/M composition depends on the temperature T given in Equ. (6):

$$\ln P(H_2) = H_h/RT + S_h/R \quad (6)$$

where $H_h$ and $S_h$ are the heat and entropy of hydride formation of M respectively, and R is the gas constant.

In operation, as shown in Equations 3 and 4, during charging hydroxide ions pass through the separator via the electrolyte from the negative electrode to the positive electrode, and water molecules pass through the separator via the electrolyte from the positive electrode to the negative electrode. During discharge, wherein a load is placed across the positive and negative terminals, water molecules pass through the separator, via the electrolyte, from the negative electrode to the positive electrode, and hydroxide ions pass through the separator, via the electrolyte, from the positive electrode to the negative electrode.

The performance of a hydride battery depends on many factors. Among others, a good hydrogen storage hydride negative electrode is a must for a good hydride battery. An ideal hydrogen storage/hydride electrode has the following properties:

high capacity,
superior electrochemical catalyst for hydrogen oxidation,
high hydrogen diffusion rate,
suitable hydrogen equilibrium pressure
excellent corrosion resistance in alkaline solution,
suitable for various temperatures
low cost.

A good hydride electrode needs good hydrogen storage electrode materials. Hong in U.S. Pat. No. 5,006,328 teaches the use of heats of hydride formation and the amount of nickel to make a useful alloy that allows for the control of hydrogen equilibrium pressure, capacity, and the electrochemical catalytic property of a hydrogen storage/hydride electrode. Thus the alloy selected and the hydride electrode made thereof has a good property. However, like other prior arts, Hong teaches the use of a single hydrogen storage material for a hydride electrode or for a hydride battery. Therefore, the hydride electrode and battery made do not have stable capacity over a range of temperatures. All the aforementioned prior arts do not teach the use of two or more hydrogen storage electrode material to make a hydride electrode and the battery thereof.

In the hydrogen storage hydride technology, it is well known that the hydrogen storage capacity of a hydrogen storage material depends on the temperature and the applied hydrogen pressure. As shown in Equ. (6), a hydride former M ($H_h<0$) will have a higher pressure as the temperature increases. Consequently, at a given pressure, it will have a lower hydrogen storage capacity as the temperature increases. Also, at a given hydrogen pressure, a hydride former, which may have the same total hydrogen storage capacity at low temperatures, often has a much less usable electrochemical capacity due to the poor kinetics at low temperatures. Therefore, a hydride electrode using only one hydrogen storage material will have different capacity at various temperatures, especially at high or low temperature. Similarly, a hydride battery using only one hydrogen storage material in its negative electrode will have different capacity at various temperatures, especially at high or low temperature. To eliminate this kind of capacity fluctuation on the temperature, the inventor discloses a method to solve this problem.

According to this invention, a negative electrode suitable for various temperatures is composed of at least two hydrogen storage electrode materials and/or their hydrides. One of the hydrogen storage electrode material (hereafter referred as the stable hydride former), which has a more negative heat of hydride formation, covers the range from a medium temperature, said 15° C., to a higher temperature up to 90° C. The other hydrogen storage electrode material (hereafter referred as the less stable hydride former), which has a slightly less negative heat of hydride formation, covers the range from ambient temperature to a lower temperature down to −40° C. Therefore, as the temperature increases, the electrochemical capacity loss in the less stable hydride former will be compensated by the gain in the stable hydride former. Similarly, as the temperature decreases, the electrochemical capacity loss in the stable hydride former will be compensated by the gain in the less stable hydride former. Consequently, the capacity of the hydride electrode consisting of at least two hydrogen storage electrode materials and/or their hydrides is less sensitive to the temperature change. One should note that a third or more hydrogen storage electrode materials may be introduced into the hydride negative electrode to enhance the capacity stability at various temperatures.

According to this invention, the negative electrode is a hydrogen storage hydride electrode which is composed of at least two hydrogen storage electrode materials having compositions represented by $A_aB_bC_c \ldots$ and $A'_aB'_bC'_c \ldots$ respectively; where the set of elements: A, B, C, . . . and the set of elements: A', B', C', . . . both are including nickel, and at least four other elements chosen from the group consisting of Mg, Ti, V, Cr, Mn, Fe, Co, Ni, Cu, Al, Y, Zr, Nb, Pd, Ag, Mo, Ca, Si, C, Cu, Ta, rare earth metals, B, Hf, Sc, Zn, Sb, W, Sn, N, O, Ge, Ga, the alkali metals, P, and S; the sets of atomic mole ratio a, b, c, . . . and a', b', c', . . . are defined by the heat of hydride formation given below; though it is not necessary, it is desirable to normalize the sum of the atomic mole ratios: a+b+c+ . . . and a'+b'+c'+ . . . to be equal to 1:

where the compositions represented by $A_aB_bC_c \ldots$ and $A'_aB'_bC'_c \ldots$ consisting of 6 to 80 at. % of nickel, preferably 24–55 at. % nickel;

where the aforementioned hydrogen storage electrode materials having compositions represented by $A_aB_bC_c$ ... and $A'_{a'}B'_{b'}C'_{c'}$ ... having the heats of hydride formation $H_h$ and $H'_h$ respectively: where $H_h$ and $H'_h$ are in a range of between −2.85 and −10.50 Kcal/mole H, preferably between −3.85 and −8.50 Kcal/mole H; and where the heats of hydride formation: $H_h$ and $H'_h$ are defined by:

$$H_h = (aH_h(A) + bH_h(B) + cH_h(C) + \ldots)/(a+b+c+\ldots) + K \quad (1)$$

$$H'_h = (a'H_h(A') + b'H_h(B') + c'H_h(C') + \ldots)/(a'+b'+c'+\ldots) + K' \quad (2)$$

where $H_h(A)$, $H_h(B)$, $H_h(C)$, ... are the heat of hydride formation of the elements A, B, C, ... in units of Kcal/mole H, respectively: and where $H_h(A')$, $H_h(B')$, $H_h(C')$, ... are the heat of hydride formation of the elements A', B', C', ... in units of Kcal/mole H, respectively; where the heat of hydride formation of the elements A, B, C, ..., in units of Kcal/mole H, is given as: $H_h(Mg)=-9.0$, $H_h(Ti)=-15.0$, $H_h(V)=-7.0$, $H_h(Cr)=-1.81$, $H_h(Mn)=-2.0$, $H_h(Fe)=4.0$, $H_h(Co)=3.5$, $H_h(Ni)=1.8$, $H_h(Al)=-1.38$, $H_h(Y)=-27$, $H_h(Zr)=-19.5$, $H_h(Nb)=-9.0$, $H_h(Pd)=-4.0$, $H_h(Mo)=-1.0$, $H_h(Ca)=-21.0$, $H_h(Si)=-1.0$, $H_h(C)=-1.0$, $H_h(Cu)=2.0$, $H_h(Ta)=-10.0$, $H_h(\text{rare earth metals})=-27.0$, $H_h(Li)=-21.0$, $H_h(Na)=-13.4$, $H_h(K)=-13.7$, $H_h(Rb)=-12.5$, $H_h(B)=2.83$, $H_h(Sn)=2.05$, $H_h(Sb)=5.5$, $H_h(Hf)=-20.2$, $H_h(Sc)=-28.9$, $H_h(Zn)=-1.2$, $H_h(Ag)=1.0$, $H_h(S)=-1.0$, $H_h(N)=-0.5$, $H_h(W)=-0.50$, and $H_h(P)=-0.30$; where K is a constant having values of 0.5, −0.2, and −1.5 Kcal/mole H for $a+b+c+\ldots$ equal to 2, 3, and 6 respectively, and having the value zero for $a+b+c+\ldots$ not equal to 2, 3 and 6; and where K' is a constant having values of 0.5, −0.2, and −1.5 Kcal/mole H for $a'+b'+c'+\ldots$ equal to 2, 3, and 6 respectively, and having the value zero for $a'+b'+c'+\ldots$ not equal to 2, 3 and 6; and where the difference between the absolute values of the heat of hydride formation $H_h$ and $H'_h$ of the alloys $A_aB_bC_c \ldots$ and $A'_{a'}B'_{b'}C'_{c'} \ldots$ being in the range between 0.10 and 5.0 Kcal/mole H, preferably between 1.0 and 3.0 Kcal/mole H; and if chosen, the rare earth metal is preferably less than 12 at. %, further preferably less than 8.0 at. %;

The heat of hydride formation governs the stability of a hydride former. The more negative heat of hydride formation is, the more stable and therefore the lower the equilibrium hydrogen pressure of a hydride former will be. If the difference in the heats of hydride formation between the two hydrogen storage electrode materials is less than 0.10 Kcal/mole, the gain or loss of the electrochemical capacity of the two hydride formers will both move to about the same direction. There is almost no gain-loss compensation. Therefore, the capacity of the electrode made still fluctuates greatly with the change in temperature and the electrode is consequently not suitable for various temperatures. Similarly, if the difference in the heats of hydride formation between the two hydrogen storage electrode materials is larger than 5.0 Kcal/mole, almost only one hydride former contributes to capacity at a given temperature. Therefore, there is also no gain-loss compensation.

According to this invention, it is obvious that a useful hydrogen storage electrode alloy must consists of at least an element having the heat of hydride formation more negative than −2.85 Kcal/mole H, and that the alloy can not contain the elements having the heats of hydride formation all more negative than −10.50 Kcal/mole H. Therefore, a hydride negative electrode is composed of at least two or more hydrogen storage electrode alloys selected from a group represented by the following formula:

where Ni is the element nickel and other components, E, G, D, M and R are defined by: E is one or more elements selected from the group consisting of: Ti, Zr, Mg, Ca, and rare earth metals; G is at least one element selected from the group consisting of: Al, V, Mn, Nb, Hf, Ta, Si, Pd and Ag; D is at least one element selected from the group consisting of: Cr, Mn, Fe, Co, Cu, Zn, Mo, W and Sn; R is at least one element selected from the group consisting of: C, B, Mg, Al, Sb, Bi, Sc, Y, Hf, Ta, N, O, Ge, and Ga; M is at least one element selected from the group consisting of Li, Na, K, Rb, Cs, P, and S; where a, b, c, x, y and z are defined by: $0.10 \leq a \leq 0.85$, $0.01 \leq b \leq 0.65$, $0.06 \leq c \leq 0.80$, $0 \leq y \leq 0.30$, $0 \leq x \leq 0.30$, $0 \leq z \leq 0.30$, and $a+b+c+y+x+z=1.00$; and where the aforementioned two hydrogen storage electrode materials selected have the heats of hydride formation in a range of between −2.85 and −10.50 Kcal/mole H, preferably between −3.85 and −8.50 Kcal/mole H; and the difference between the two heats of hydride formation is in the range between 0.10 and 5.0 Kcal/mole H, preferably, between 1.0 and 3.0 Kcal/mole H; and if chosen, the rare earth metal is preferably less than 12 at. %, further preferably less than 8.0 at. %;

Alternatively, a hydride negative electrode is composed of at least two hydrogen storage electrode alloys selected from one or the combination of the following groups:

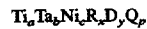

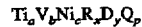

and its hydride thereof, where R is at least one element selected from the group consisting of B, Hf, Sc, Zn, Sb, W, Sn, N, O, Ge, Ga, P, S, and alkali metals; D is at least one element selected from the group consisting of Mn, Si, Cr, Fe, Co, Cu and rare earth metals; Q is least one element selected from the group consisting of C, Mg, Ca, Sr, Ba, Al, Si, V, Zr, Nb, Mo, Pd, Ag, Y, Ta, La, Ce, and rare earth metals; and where the atomic mole ratios: a, b, c, x, y and p are defined by: $0.10 \leq a \leq 0.85$, $0.001 \leq b \leq 0.50$, $0.06 \leq c \leq 0.80$, $0 \leq x \leq 0.30$, $0 \leq y \leq 0.30$, $0 \leq p \leq 0.45$, and $a+b+c+x+y+p=1.00$; and where the aforementioned two hydrogen storage electrode materials selected have the heats of hydride formation in a range of between −2.85 and −10.50 Kcal/mole H, preferably between −3.85 and −8.50 Kcal/mole H; and the difference between the two heats of hydride formation is in the range between 0.10 and 5.0 Kcal/mole H, preferably, between 1.0 and 3.0 Kcal/mole H.

Several exemplary alloys related to the $Ti_aNb_bNi_cR_xD_yQ_p$ group of the present invention are:

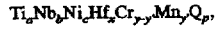

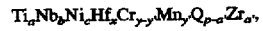

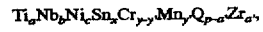

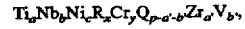

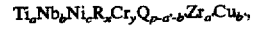

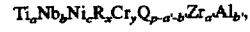

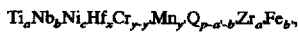

and its hydride thereof; where R is at least one element selected from the group consisting of B, Hf, Sc, Zn, Sb, W, Sn, N, O, Ge, Ga, P, S, and alkali metals: Q is least one element selected from the group consisting of C, Mg, Ca, Sr, Ba, Al, Si, V, Cr, Mn, Fe, Co, Cu, Zr, Mo, Pd, Ag, Y, Ta, La, Ce, and Mm; and where the atomic mole ratios: a, a', b, c, x, y, y', and p are defined by: a+b+c+x+y+p=1.00; $0.10 \leq a \leq 0.85$, $0 \leq a' \leq 0.30$, $0.001 \leq b \leq 0.50$, $0 \leq b' \leq 0.30$, $0.06 \leq c \leq 0.85$, $0 \leq x \leq 0.30$, $0 \leq y \leq 0.30$, $0 \leq y' \leq y$, and $0 \leq p \leq 0.45$; preferably, $0.15 \leq a \leq 0.63$, $0.01 \leq b \leq 0.38$, $0.15 \leq c \leq 0.60$, $0 \leq x \leq 0.15$, $0 \leq y \leq 0.15$ and $0 \leq p \leq 0.30$.

Several exemplary alloys related to the $Ti_aHf_bNi_cR_xD_yQ_p$ group of the present invention are:

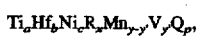

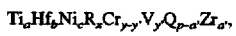

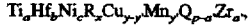

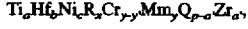

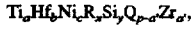

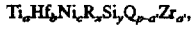

and its hydride thereof; where R is at least one element selected from the group consisting of B, Hf, Sc, Zn, Sb, W, Sn, N, O, Ge, Ga, P, S, and alkali metals; Q is least one element selected from the group consisting of C, Mg, Ca, Sr, Ba, Al, Si, V, Cr, Mn, Fe, Co, Cu, Zr, Nb, Mo, Pd, Ag, Y, Ta, La, Ce, and Mm: and where the atomic mole ratios: a, a', b, c, x, y, y', and p are defined by: $0.10 \leq a \leq 0.85$, $0 \leq a' \leq 0.30$, $0.001 \leq b \leq 0.50$, $0.02 \leq c \leq 0.85$, $0 \leq x \leq 0.30$, $0 \leq y \leq 0.30$, $0 \leq y' \leq y$, $0 \leq p \leq 0.45$, and a+b+c+x+y+p=100; preferably, $0.15 \leq a \leq 0.63$, $0.01 \leq b \leq 0.38$, $0.15 \leq c \leq 0.60$, $0 < x \leq 0.15$, $0 \leq y \leq 0.15$ and $0 \leq p \leq 0.30$.

Several exemplary alloys related to the $Ti_aV_bNi_cR_xD_yQ_p$ group of the present invention are:

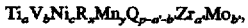

and its hydride thereof, where R is at least one element selected from the group consisting of B, Hf, Sc, Zn, Sb, W, Sn, N, O, Ge, Ga, P, S, and alkali metals: Q is least one element selected from the group consisting of C, Mg, Ca, Sr, Ba, Al, Si, V, Cr, Mn, Fe, Co, Cu, Zr, Nb, Mo, Pd, Y, Ta, La, Ce, and Mm; and where the atomic mole ratios: a, a', b, b', c, x, y, y', and p are defined by: $0.10 \leq a \leq 0.85$, $0 \leq a' \leq 0.30$, $0 \leq b' \leq 0.30$, $0.001 \leq b \leq 0.50$, $0.02 \leq c \leq 0.85$, $0 \leq x \leq 0.30$, $0 \leq y \leq 0.30$, $0 \leq y' \leq y$, $0 \leq p \leq 0.45$, and a+b+c+x+y+p=1.00; preferably, $0.15 \leq a \leq 0.63$, $0.01 \leq b \leq 0.38$, $0.15 \leq c \leq 0.60$, $0 < x \leq 0.15$, $0 \leq y \leq 0.15$ and $0 \leq p \leq 0.30$.

The hydrogen storage electrode materials selected having compositions according to the present invention can be prepared first by mixing proper amounts of the elements or mixing elements with other commercially available master alloys such as nickel-zirconium, nickel-vanadium, ferrovanadium, ferrotitanium, aluminum-vanadium, nickel-niobium, etc., and then melting them in a crucible selected from graphite, alumna, zirconia or water-cooled copper, in an induction or arc furnace under a protective atmosphere selected from inert gas such as argon, hydrogen, nitrogen, hydrocarbon gas and a mixture thereof. The hydrogen storage electrode containing at least two hydrogen storage electrode materials of the present invention is then prepared by a sintering or a pasting method with or without one or more powder binders selected from the group consisting of nickel, copper, aluminum, zinc, carbon black, organic conductive polymer, PTFE, CMC, PVA (polyvinyl alcohol), polyox, methylcellulose and hydroxylmethyl cellulose. The sizes of the powder binder are from 0.2 to 150 micrometers, preferably from 0.5 to 50 micrometers. The substrate current collector is selected from nickel, or nickel-plated steel or nickel-plated plastics mesh, sponge, foam, fabric, or perforated or expanded sheet, preferably nickel or nickel-plated sponge or nickel-plated fabric having 80–99% porosity. In case of the sintering method, the dried powder of the two or more hydrogen storage electrode materials having sizes between 100 mesh to 400 mesh, with or without the aforementioned powder binders, is pressed with a pair of rollers onto the substrate to form the preliminary electrode which is then heated, under vacuum or a protective atmosphere such as argon, nitrogen, hydrocarbon gas, hydrogen or a mixture thereof, at temperatures of from 200° to 1100° C. for 10 to 60 minutes; preferably, at temperatures from 450° to 950° C. for 10 to 20 minutes. In the case of the pasting method, the alloy powder having sizes between 100 mesh to 400 mesh is mixed with one or more of the aforementioned powder binders and pure water to make a paste or slurry. Then the paste or slurry is pressed onto the substrate current collector with pasting, printing or doctor blade method. The resulting wet hydrogen storage hydride electrode is then dried at temperatures of from 60° to 300° C. for 20 to 90 minutes under vacuum or a protective atmosphere selected from the group consisting of argon, nitrogen, hydrocarbon, hydrogen or the combination thereof. The dried hydrogen storage electrode, if necessary, can be treated with a weak acidic solution with a pH value between 3 and 7, preferably 5.5 to 6.5, at temperatures of between 20° to 120° C. for 5 to 60 minutes, preferably at between 45° to 85° C. for 15 to 30 minutes. In this case, the electrode then is subjected to washing and drying processes. The electrode made is ready to be used as a negative electrode.

The battery, according to this invention, is composed of a container, a positive electrode, a negative electrode of this invention, a separator positioned between the positive and negative electrodes, and an electrolyte in the container and in contact with the positive and negative electrodes and the separator. Consequently, the capacity of the hydride battery consisting of at least two hydrogen storage electrode materials and/or their hydrides is less sensitive to the temperature change. Therefore the hydride battery of this invention is suitable for various temperatures.

A suitable size of the negative electrode is cut to combine with a matching size of the metal oxide positive. The positive electrode active material at least one comprises a metal oxide, preferably a nickel oxide plus 1–15 wt. % cobalt oxide. The substrate current collector is selected from nickel, or nickel-plated steel or nickel-plated plastics mesh, sponge, foam, fabric, or perforated or expanded sheet, preferably nickel or nickel-plated sponge or fabric having 80–99% porosity. To ensure high efficiency, 1–15 wt. % of fine conductive powder selected from the group consisting of nickel, copper, carbon, organic conductive polymer, zinc and aluminum and combinations thereof, is added during the preparation of slurry or paste of the positive electrode. The separator is cut of a similar size and is placed between the negative and positive electrodes to electrically separate them. The separator is a porous thin sheet selected from polyamide such as nonwoven nylon, polypropylene and polysulfone. Finally, an electrolyte is added to complete an electrochemical cell.

TABLE 1

| Alloy No. | Alloy Composition | $-H_h$ (Kcal/mole H) |
|---|---|---|
| 1 | $Ti_{0.13}Nb_{0.50}Ni_{0.17}Hf_{0.05}Cr_{0.09}Mn_{0.06}$ | 6.91 |
| 2 | $Ti_{0.41}Nb_{0.09}Ni_{0.40}Hf_{0.01}B_{0.03}Cu_{0.04}Mm_{0.02}$ | 6.23 |
| 3 | $Ti_{0.28}Nb_{0.12}Ni_{0.46}Zr_{0.03}Cr_{0.03}Mn_{0.04}Cu_{0.04}$ | 4.88 |
| 4 | $Ti_{0.30}Nb_{0.35}Ni_{0.05}Sn_{0.05}Mn_{0.20}Al_{0.05}$ | 7.51 |
| 5 | $Ti_{0.33}Nb_{0.12}Ni_{0.46}Zr_{0.02}Cr_{0.03}Mn_{0.04}$ | 5.51 |
| 6 | $Ti_{0.20}Zr_{0.12}Ni_{0.41}V_{0.06}Cr_{0.06}Mn_{0.04}$ | 6.17 |
| 7 | $Ti_{0.08}Nb_{0.34}Ni_{0.30}Zn_{0.04}Cr_{0.02}Al_{0.02}Zr_{0.20}$ | 7.34 |
| 8 | $Ti_{0.22}Nb_{0.14}Ni_{0.39}B_{0.02}Cr_{0.05}Mn_{0.04}Zr_{0.14}$ | 6.49 |
| 9 | $Ti_{0.33}Nb_{0.12}Ni_{0.46}Zr_{0.02}Cr_{0.03}B_{0.04}$ | 5.32 |
| 10 | $Ti_{0.16}Nb_{0.32}Ni_{0.22}Hf_{0.03}Cr_{0.12}Mn_{0.04}Zr_{0.10}$ | 7.59 |
| 11 | $Ti_{0.26}Nb_{0.09}Ni_{0.40}Sb_{0.02}Cr_{0.06}Cr_{0.02}Zr_{0.15}$ | 7.09 |
| 12 | $Ti_{0.22}Nb_{0.07}Ni_{0.43}Sn_{0.02}Cr_{0.03}Al_{0.04}V_{0.04}Zr_{0.17}$ | 6.64 |
| 13 | $Ti_{0.27}Nb_{0.06}Ni_{0.40}Zn_{0.04}Mn_{0.04}Al_{0.01}Zr_{0.18}$ | 7.32 |
| 14 | $Ti_{0.11}Nb_{0.52}Ni_{0.18}W_{0.02}Cr_{0.13}Co_{0.02}Zr_{0.02}$ | 6.01 |
| 15 | $Ti_{0.33}Zr_{0.02}Ni_{0.48}V_{0.12}Cr_{0.02}Cu_{0.03}$ | 5.19 |
| 16 | $Ti_{0.25}Zr_{0.15}Mn_{0.05}V_{0.08}Ni_{0.40}Mo_{0.03}B_{0.04}$ | 6.48 |
| 17 | $Ti_{0.26}Zr_{0.17}Mn_{0.06}V_{0.06}Ni_{0.40}Hf_{0.02}Cr_{0.03}$ | 7.42 |
| 18 | $Ti_{0.22}Nb_{0.20}Ni_{0.30}B_{0.06}Si_{0.02}Zr_{0.20}$ | 8.25 |
| 19 | $Ti_{0.34}Hf_{0.06}Ni_{0.25}Nb_{0.30}Al_{0.05}$ | 8.27 |
| 20 | $Ti_{0.50}Hf_{0.03}Ni_{0.35}Mn_{0.08}Cu_{0.04}$ | 7.87 |
| 21 | $Ti_{0.16}Zr_{0.10}Mn_{0.04}V_{0.32}Ni_{0.22}Hf_{0.04}Cr_{0.08}Al_{0.04}$ | 7.25 |
| 22 | $Ti_{0.25}Zr_{0.17}V_{0.08}Cr_{0.06}Ni_{0.39}Hf_{0.01}Zn_{0.04}$ | 7.30 |
| 23 | $Ti_{0.36}Hf_{0.16}Ni_{0.28}V_{0.15}B_{0.02}Mm_{0.03}$ | 8.75 |
| 24 | $Ti_{0.16}Hf_{0.06}Ni_{0.25}Nb_{0.30}Al_{0.05}Zr_{0.18}$ | 9.06 |
| 25 | $Ti_{0.25}Hf_{0.02}Ni_{0.40}Nb_{0.05}Zr_{0.28}$ | 9.21 |
| 26 | $Ti_{0.20}Hf_{0.11}V_{0.06}Cr_{0.06}Ni_{0.41}Mn_{0.04}Zr_{0.12}$ | 7.25 |
| 27 | $Ti_{0.23}Hf_{0.01}V_{0.20}Ni_{0.43}Si_{0.03}Zr_{0.10}$ | 6.34 |
| 28 | $Ti_{0.40}Zr_{0.04}Ni_{0.44}Cu_{0.06}Mn_{0.04}Li_{0.02}$ | 6.28 |
| 29 | $Ti_{0.16}Zr_{0.12}Ni_{0.46}V_{0.22}Cr_{0.02}Co_{0.02}$ | 5.32 |
| 30 | $Ti_{0.10}Zr_{0.08}Hf_{0.06}Nb_{0.44}Ni_{0.20}Cr_{0.08}Al_{0.02}$ | 7.96 |
| 31 | $Ti_{0.26}Hf_{0.06}Ni_{0.39}Mo_{0.03}Cr_{0.04}Cu_{0.04}Zr_{0.18}$ | 8.12 |
| 32 | $Ti_{0.16}Hf_{0.06}Ni_{0.25}Nb_{0.26}Al_{0.05}Mn_{0.04}Zr_{0.18}$ | 8.84 |
| 33 | $Ti_{0.22}Zr_{0.17}V_{0.14}Cr_{0.04}Ni_{0.39}Mn_{0.04}$ | 6.98 |
| 34 | $Ti_{0.08}Zr_{0.20}V_{0.28}Cr_{0.04}Ni_{0.35}Mn_{0.05}$ | 6.54 |
| 35 | $Ti_{0.41}Nb_{0.12}Ni_{0.38}Hf_{0.02}Mn_{0.05}W_{0.02}$ | 6.85 |
| 36 | $Ti_{0.07}Zr_{0.03}Ni_{0.52}Co_{0.23}Mm_{0.12}Al_{0.03}$ | 3.07 |
| 37 | $Ti_{0.10}V_{0.53}Ni_{0.17}Cr_{0.16}Mn_{0.02}Nb_{0.02}$ | 5.37 |
| 38 | $Ti_{0.16}Ta_{0.12}Ni_{0.38}Al_{0.03}Cr_{0.04}Zr_{0.25}Fe_{0.02}$ | 7.75 |
| 39 | $Ti_{0.10}Zr_{0.20}Ni_{0.35}V_{0.28}Cr_{0.05}Mn_{0.02}$ | 6.80 |
| 40 | $Ti_{0.24}Zr_{0.17}Ni_{0.41}V_{0.10}Cr_{0.06}Mn_{0.02}$ | 6.96 |
| 41 | $Ti_{0.22}Zr_{0.02}Ni_{0.25}V_{0.27}Cr_{0.03}Mn_{0.03}$ | 8.71 |
| 42 | $Ti_{0.14}Zr_{0.13}Ni_{0.27}V_{0.33}Cr_{0.13}Mn_{0.04}$ | 6.73 |
| 43 | $Ti_{0.35}V_{0.10}Ni_{0.35}Hf_{0.04}Mm_{0.05}Mo_{0.05}Co_{0.06}$ | 7.11 |
| 44 | $Ti_{0.10}Zr_{0.20}Ni_{0.35}Nb_{0.28}Cr_{0.05}Mn_{0.02}$ | 7.08 |
| 45 | $Ti_{0.26}Zr_{0.16}Ni_{0.39}V_{0.09}Cr_{0.06}Mn_{0.04}$ | 7.07 |
| 46 | $Ti_{0.36}V_{0.15}Ni_{0.35}Hf_{0.04}Mn_{0.05}Mo_{0.05}$ | 6.75 |
| 47 | $Ti_{0.25}V_{0.13}Ni_{0.34}B_{0.04}Cr_{0.05}Zr_{0.16}Li_{0.03}$ | 7.71 |
| 51 | $Ti_{0.20}Zr_{0.20}V_{0.08}Ni_{0.34}B_{0.04}Si_{0.04}Mn_{0.10}$ | 9.21 |
| 52 | $Ti_{0.16}Ta_{0.08}Ni_{0.36}Hf_{0.04}Nb_{0.30}Al_{0.04}Mn_{0.02}$ | 5.74 |
| 53 | $Ti_{0.17}Zr_{0.20}Mn_{0.08}V_{0.08}Ni_{0.40}Hf_{0.04}Al_{0.03}$ | 7.21 |
| 54 | $Ti_{0.20}V_{0.08}Ni_{0.40}B_{0.04}Mn_{0.07}Al_{0.03}Zr_{0.18}$ | 6.34 |
| 55 | $Ti_{0.25}V_{0.08}Ni_{0.43}Hf_{0.04}Mn_{0.10}Zr_{0.10}$ | 6.40 |
| 56 | $Ti_{0.26}Zr_{0.15}Hf_{0.02}Nb_{0.09}Ni_{0.40}Cr_{0.06}Mn_{0.02}$ | 7.39 |
| 57 | $Ti_{0.20}Cr_{0.15}V_{0.40}Ni_{0.20}Hf_{0.05}$ | 6.69 |
| 58 | $Ti_{0.15}Cr_{0.10}Ni_{0.22}Hf_{0.03}Nb_{0.45}Mn_{0.05}$ | 6.67 |
| 59 | $Ti_{0.25}Zr_{0.17}Ni_{0.39}Nb_{0.08}Hf_{0.01}Cr_{0.06}Mn_{0.04}$ | 7.21 |
| 60 | $Ti_{0.20}V_{0.08}Ni_{0.40}B_{0.04}Mn_{0.08}Zr_{0.20}$ | 6.71 |

EXAMPLE 1

Table 1 lists some alloys having compositions in the present invention. The hydrogen storage electrode materials are all have the heats of hydride formation in the range between −2.85 and −10.0 Kcal/mole H. Two or more of the materials having the difference in heat of hydride formation between 0.10 and 5.50 Kcal/mole H can be selected to make a hydrogen storage hydride electrode suitable for various temperature electrochemical applications.

EXAMPLE 2

According to this invention, hydrogen storage electrode materials $Ti_{0.15}Cr_{0.10}Hf_{0.03}Nb_{0.45}Ni_{0.22}Mn_{0.05}$ (alloy 1), and $Ti_{0.25}Zr_{0.17}Nb_{0.08}Hf_{0.01}Cr_{0.06}Ni_{0.39}Mn_{0.04}$ (alloy 2) were made. A hydride electrode (electrode A) consisting of alloy 1 and alloy 2 in a 1:1 mole ratio was made by a sintering method. The substrate current collector was a nickel-plated steel fabric. The capacity of electrode A (AA-size) at various temperatures was determined in a 30 wt. % KOH solution using a sintered nickel positive electrode as a counter electrode. For comparison, similar AA-size electrodes: electrode B with 100% alloy 1 and electrode C with 100% alloy 2 as the active material of the negative electrode were made and tested. As shown in Table 2, it is clear that electrode A of the present invention has a much better performance at various temperatures between −10° C. and 50° C. The capacities of electrode B and electrode C which contain single hydrogen storage electrode material both change with temperature significantly.

TABLE 2

| | Capacity (AH) at Temperature | | | |
|---|---|---|---|---|
| Electrode | 50° C. | 25° C. | 0° C. | −10° C. |
| A | 1.89 AH | 1.92 | 1.90 | 1.87 |
| B | 1.77 | 1.88 | 1.92 | 1.90 |
| C | 1.95 | 1.94 | 1.83 | 1.73 |

Cell A: the negative electrode contains 50 mole % alloy 1 and 50 mole % alloy 2.
Cell B: the negative electrode contains 100% alloy 1
Cell C: the negative electrode contains 100% alloy 2.

TABLE 3

| | Capacity (AH) at Temperature | | | | |
|---|---|---|---|---|---|
| AA Cell | 50° C. | 40° C. | 25° C. | 0° C. | −10° C. |
| A | 1.30 AH | 1.32 | 1.32 | 1.30 | 1.25 |
| B | 1.20 | 1.27 | 1.34 | 1.32 | 1.28 |
| C | 1.34 | 1.33 | 1.30 | 1.23 | 1.16 |

Cell A: the negative electrode contains 50 mole % alloy 1 and 50 mole % alloy 2.
Cell B: the negative electrode contains 100% alloy 1
Cell C: the negative electrode contains 100% alloy 2.

EXAMPLE 3

According to this invention, hydrogen storage electrode materials, $Ti_{0.20}Cr_{0.15}Hf_{0.05}V_{0.40}Ni_{0.20}$ (alloy 1) and $Ti_{0.26}Zr_{0.15}Hf_{0.02}Nb_{0.09}Ni_{0.40}Cr_{0.06}Mn_{0.02}$ (alloy 2) were prepared. Alloy 1 and alloy 2 with 6:4 mole ratio were impregnated into a highly porous nickel sponge substrate current collector to make a sintered hydride negative electrode and a sealed AA-size nickel-hydride cell (cell A) thereof. In cell A, a pasted nickel positive electrode and nonwoven nylon separator were used. The electrolyte was 30 wt. % KOH+5% LiOH solution. For comparison, similar AA-size cells: cell B with 100% alloy 1 as the active material of the negative electrode and cell C with 100% alloy 2 as the active material of the negative electrode were made. As shown in Table 2, it is clear that cell A of the present invention has a much better performance at various temperatures between −10° C. and 50° C. The capacities of Cell B and Cell C both change with temperature significantly.

What is claimed is:

1. A method to make a hydrogen storage hydride electrode suitable for various temperatures, said method comprises the steps of:
   (1) Selecting at least two hydrogen storage electrode materials having compositions represented by $A_aB_bC_c$ and $A'_{a'}B'_{b'}C'_{c'}$ respectively;
   (2) Preparing said hydrogen storage electrode materials: $A_aB_bC_c$ and $A'_{a'}B'_{b'}C'_{c'}$, and powder thereof;
   (3) Impregnating the powder of said hydrogen storage electrode materials to a substrate current collector by a sintering of a pasting method;
   wherein said material $A_aB_bC_c$ consists of 6 to 80 at. % of Ni, and at least four other elements chosen from the group consisting of Mg, Ti, V, Cr, Mn, Fe, Co, Ni, Cu, Al, Y, Zr, Nb, Pd, Ag, Mo, Ca, Si, C, Cu, Ta, rare earth metals, B, Hf, Sc, Zn, Sb, W, Sn, N, O, Ge, Ga, the alkali metals, P, and S;
   wherein said material $A'_{a'}B'_{b'}C'_{c'}$ consists of 6 to 80 at. % of Ni, and at least four other elements chosen from the group consisting of Mg, Ti, V, Cr, Mn, Fe, Co, Ni, Cu, Al, Y, Zr, Nb, Pd, Ag, Mo, Ca, Si, C, Cu, Ta, rare earth metals, B, Hf, Sc, Zn, Sb, W, Sn, N, O, Ge, Ga, the alkali metals, P, and S;
   wherein said material $A_aB_bC_c$ has a heat of hydride formation, $H_h$, in a range between −2.85 and −10.50 Kcal/mole H, and the atomic mole ratios: a, b, c, are defined by:

$$H_h = [aH_h(A) + bH_h(B) + cH_h(C)]/(a+b+c) + K,$$

where $H_h(A)$, $H_h(B)$, $H_h(C)$ are the heats of hydric formation of the elements A, B, C in units of Kcal/mole H, respectively, where K is a constant having values of 0.5, −0.2, and −1.5 Kcal/mole H for a+b+c equal to 2, 3, and 6 respectively, and having the value zero for a+b+c not equal to 2, 3 and 6;
   wherein said material $A'_{a'}B'_{b'}C'_{c'}$ has the heat of hydride formation. $H'_h$, in a range between −2.85 and −10.50 Kcal/mole H and the atomic ratios: a', b', c' are defined by:

$$H'_h = [a'H_h(A') + b'H_h(B') + c'H_h(C')]/(a'+b'+c') + K',$$

where $H_h(A')$, $H_h(B')$, $H_h(C')$ are the heats of hydride formation of the elements A', B', C' in units of Kcal/mole H, respectively; where K' is a constant having values of 0.5, −0.2, and −1.5 Kcal/mole H for a+b+c equal to 2, 3, and 6 respectively, and having the value zero for a'+b'+c' not equal to 2, 3 and 6;
   wherein the heat of hydride formation of the elements in units of Kcal/mole H, is given as:
   $H_h(Mg)=−9.0$, $H_h(Ti)=−15.0$, $H_h(V)=−7.0$, $H_h(Cr)=−1.81$, $H_h(Mn)=−2.0$, $H_h(Fe)=4.0$, $H_h(Co)=3.5$, $H_h(Ni)=1.8$, $H_h(Al)=−1.38$, $H_h(Y)=−27$, $H_h(Zr)=−19.5$, $H_h(Nb)=−9.0$, $H_h(Pd)=−4.0$, $H_h(Mo)=−1.0$, $H_h(Ca)=−21.0$, $H_h(Si)=−1.0$, $H_h(C)=−1.0$, $H_h(Cu)=2.0$, $H_h(Ta)=−10.0$, $H_h(\text{rare earth metals})=−27.0$, $H_h(Li)=−21.0$, $H_h(Na)=−13.4$, $H_h(K)=−13.7$, $H_h(Rb)=−12.5$, $H_h(B)=2.83$, $H_h(Sn)=2.05$, $H_h(Sb)=5.5$, $H_h(Hf)=−20.2$, $H_h(Sc)=−28.9$, $H_h(Zn)=−1.2$, $H_h(Ag)=1.0$, $H_h(S)=−1.0$, $H_h(N)=−0.5$, $H_h(W)=−0.50$, and $H_h(P)=−0.30$.

2. A method of claim 1, wherein the difference between the absolute values of the heats of hydride formation, $H_h$ and $H'_h$ of said hydrogen storage materials, $A_aB_bC_c$ and $A'_{a'}B'_{b'}C'_{c'}$ is in the range between 0.10 and 5.0 Kcal/mole H.

3. A method of claim 1, wherein the portion of each one of said hydrogen storage electrode materials is between 5 wt. % and 95 wt. % of the total of said hydrogen storage electrode materials.

4. A hydrogen storage hydride electrode made in accordance with the method of claim 1.

5. A method of claim 1, wherein said substrate current collector of said hydride electrode is selected from the group consisting of sponge, fabric, foam, mesh, perforated or expanded sheet of nickel, or nickel-plated steel and nickel-plated plastics.

6. A hydrogen storage electrode suitable for various temperatures, said electrode comprises at least two hydrogen storage electrode materials having compositions represented by $A_aB_bC_c$ and $A'_{a'}B'_{b'}C'_{c'}$ respectively,
   wherein said material $A_aB_bC_c$ consists of 6 to 80 at. % of Ni, and at least four other elements chosen from the group consisting of Mg, Ti, V, Cr, Mn, Fe, Co, Ni, Cu, Al, Y, Zr, Nb, Pd, Ag, Mo, Ca, Si, C, Cu, Ta, rare earth metals, B, Hf, Sc, Zn, Sb, W, Sn, N, O, Ge, Ga, the alkali metals, P, and S;
   wherein said material $A'_{a'}B'_{b'}C'_{c'}$ consists of 6 to 80 at. % of Ni, and at least four other elements chosen from the group consisting of Mg, Ti, V, Cr, Mn, Fe, Co, Ni, Cu, Al, Y, Zr, Nb, Pd, Ag, Mo, Ca, Si, C, Cu, Ta, rare earth metals, B, Hf, Sc, Zn, Sb, W, Sn, N, O, Ge, Ga, the alkali metals, P, and S;
   wherein said material $A_aB_bC_c$ has a heat of hydride formation, $H_h$, in a range between −2.85 and −10.50 Kcal/mole H, and the atomic mole ratios: a, b, c, are defined by:

$$H_h = [aH_h(A) + bH_h(B) + cH_h(C)]/(a+b+c) + K$$

where $H_h(A)$, $H_h(B)$, $H_h(C)$ are the heats of hydride formation of the elements A, B, C in units of Kcal/mole H, respectively; where K is a constant having values of 0.5, −0.2, and −1.5 Kcal/mole H for a+b+c equal to 2, 3, and 6 respectively, and having the value zero for a+b+c not equal to 2,3 and 6;
   wherein said material $A'_{a'}B'_{b'}C'_{c'}$ has a heat of hydride formation, $H'_h$, in a range between −2.85 and −10.50 Kcal/mole H and the atomic mole ratios: a', b', c' are defined by:

$$H'_h = [a'H_h(A') + b'H_h(B') + c'H_h(C')]/(a'+b'+c') + K';$$

where $H_h(A')$, $H_h(B')$, $H_h(C')$ are the heats of hydride formation of the elements A', B', C' in units of Kcal/mole H, respectively; where K' is a constant having values of 0.5, −0.2, and −1.5 Kcal/mole H for a'+b'+c' equal to 2, 3, and 6 respectively, and having the value zero for a'+b'+c' not equal to 2, 3 and 6;
   wherein the heat of hydride formation of the elements in units of Kcal/mole H is given as:
   $H_h(Mg)=−9.0$, $H_h(Ti)=−15.0$, $H_h(V)=−7.0$, $H_h(Cr)=−1.81$, $H_h(Mn)=−2.0$, $H_h(Fe)=4.0$, $H_h(Co)=3.5$, $H_h(Ni)=1.8$, $H_h(Al)=−1.38$, $H_h(Y)=−27$, $H_h(Zr)=−19.5$, $H_h(Nb)=−9.0$, $H_h(Pd)=−4.0$, $H_h(Mo)=−1.0$, $H_h(Ca)=−21.0$, $H_h(Si)=−1.0$, $H_h(C)=−1.0$, $H_h(Cu)=2.0$, $H_h(Ta)=−10.0$, $H_h(\text{rare earth metals})=−27.0$, $H_h(Li)=−21.0$, $H_h(Na)=−13.4$, $H_h(K)=−13.7$, $H_h(Rb)=−12.5$, $H_h(B)=2.83$, $H_h(Sn)=2.05$, $H_h(Sb)=5.5$, $H_h(Hf)=−20.2$, $H_h(Sc)=−28.9$, $H_h(Zn)=−1.2$, $H_h(Ag)=1.0$, $H_h(S)=−1.0$, $H_h(N)=−0.5$, $H_h(W)=−0.50$, and $H_h(P)=−0.30$,
   wherein the powder of said hydrogen storage electrode materials is impregnated to a substrate current collector by a sintering or a pasting method.

7. A hydrogen storage electrode of claim 6, wherein the difference between the absolute values of the heats of hydride formation, $H_h$ and $H'_h$ of said hydrogen storage materials, $A_aB_bC_c$ and $A'_aB'_bC'_c$ is in the range between 0.10 and 5.0 Kcal/mole H.

8. A method to make a hydride storage electrode, wherein said electrode comprises at least two or more hydrogen storage electrode alloys represented by the following formula:

$$E_aG_bNi_xD_yM_xR_z$$

where E is one or more elements selected from the group consisting of Ti, Zr, Mg, Ca, and rare earth metals; G is at least one element selected from the group consisting of Al, V, Mn, Nb, Hf, Ta, Si, Ag, and Pd; D is at least one element selected from the group consisting of Cr, Mn, Fe, Co, Cu, Zn, Mo, W and Sn; R is at least one element selected from the group consisting of C, B, Mg, Al, Ca, Sb, Bi, Sc, Y, Hf, Ta, N, O, Ge, and Ga; M is at least one element selected from the group consisting of Li, Na, K, Rb, Cs, P and S; where a, b, c, x, y and z are defined by: $0.10 \leq a \leq 0.85$, $0.01 \leq b \leq 0.65$, $0.06 \leq c \leq 0.80$, $0 \leq y \leq 0.30$, $0 \leq x \leq 0.30$, $0 \leq z \leq 0.30$, and $a+b+c+y+x+z=1.00$; and where said hydrogen storage electrode materials selected have the heats of hydride formation in a range of between −2.85 and −10.50 Kcal/mole H;

wherein the powder of said hydrogen storage electrode materials is impregnated to a substrate current collector by a sintering or a pasting method.

9. A hydride storage electrode made in accordance with the method of claim 8.

10. A hydride battery suitable for various temperatures, said battery comprises a container, a positive electrode, a hydride negative electrode, a separator positioned between the positive and negative electrodes, and electrolyte in the container and in contact with said positive and negative electrodes and said separator;

wherein said positive electrode comprises a nickel oxide plus 1–15 wt. % cobalt oxide and 1 . 15 wt. % of conductive powder selected from the group consisting of Ni, Cu, C, Zn, Al, organic polymer, and combinations thereof;

wherein said hydride negative electrode comprises at least two hydrogen storage electrode materials having compositions represented by $A_aB_bC_c$ and $A'_aB'_bC'_c$, respectively;

wherein said materials $A_aB_bC_c$ and $A'_aB'_bC'_c$, consist of 6 to 80 at. % of Ni, and at least four other elements chosen from the group consisting of Mg, Ti, V, Cr, Mn, Fe, Co, Ni, Cu, Al, Y, Zr, Nb, Pd, Ag, Mo, Ca, Si, C, Cu, Ta, rare earth metals, B, Hf, Sc, Zn, Sb, W, Sn, N, O, Ge, Ga, the alkali metals, P, and S;

where said material $A_aB_bC_c$ has a heat of hydride formation, $H_h$, in a range between −2.85 and −10.50 Kcal/mole H, and the atomic mole ratios: a, b, c, are defined by:

$$H_h = [aH_h(A)+bH_h(B)+cH_h(C)]/(a+b+c)+K$$

where $H_h(A)$, $H_h(B)$, $H_h(C)$ are the heats of hydride formation of the elements A, B, C in units of Kcal/mole H, respectively; where K is a constant having values of 0.5, −0.2, and −1.5 Kcal/mole H for a+b+c equal to 2, 3, and 6 respectively, and having the value zero for a+b+c not equal to 2,3 and 6;

where said material $A'_aB'_bC'_c$, has a heat of hydride formation, $H'_h$, in a range between −2.85 and −10.50 Kcal/mole H and the atomic ratios: a', b', c' are defined by:

$$H'_h=[a'H_h(A')+b'H_h(B')+c'H_h(C')]/(a'+b'+c')+K';$$

where $H_h(A')$, $H_h(B')$, $H_h(C')$ are the heats of hydride formation of the elements A', B', C' in units of Kcal/mole H, respectively; where K' is a constant having values of 0.5, −0.2, and −1.5 Kcal/mole H for a'+b'+c' equal to 2, 3, and 6 respectively, and having the value zero for a'+b'+c' not equal to 2,3 and 6;

wherein the heat of hydride formation of the elements in units of Kcal/mole H, is given as:

$H_h(Mg)=−9.0$, $H_h(Ti)=−15.0$, $H_h(V)=−7.0$, $H_h(Cr)=−1.81$, $H_h(Mn)=−2.0$, $H_h(Fe)=4.0$, $H_h(Co)=3.5$, $H_h(Ni)=1.8$, $H_h(Al)=−1.38$, $H_h(Y)=−27$, $H_h(Zr)=−19.5$, $H_h(Nb)=−9.0$, $H_h(Pd)=−4.0$, $H_h(Mo)=−1.0$, $H_h(Ca)=−21.0$, $H_h(Si)=−1.0$, $H_h(C)=−1.0$, $H_h(Cu)=2.0$, $H_h(Ta)=−10.0$, $H_h(\text{rare earth metals})=−27.0$, $H_h(Li)=−21.0$, $H_h(Na)=−13.4$, $H_h(K)=−13.7$, $H_h(Rb)=−12.5$, $H_h(B)=2.83$, $H_h(Sn)=2.05$, $H_h(Sb)=5.5$, $H_h(Hf)=−20.2$, $H_h(Sc)=−28.9$, $H_h(Zn)=−1.2$, $H_h(Ag)=1.0$, $H_h(S)=−1.0$, $H_h(N)=−0.5$, $H_h(W)=−0.50$, and $H_h(P)=−0.30$.

11. A hydride battery of claim 10, wherein the difference between the absolute values of the heats of hydride formation, $H_h$ and $H'_h$ of said hydrogen storage materials, $A_aB_bC_c$ and $A'_aB'_bC'_c$ is in the range between 0.10 and 5.0 Kcal/mole H.

12. A hydride battery suitable for various temperatures, said battery comprises a container, a positive electrode, a hydride negative electrode, a separator positioned between the positive and negative electrodes, and electrolyte in the container and in contact with the positive and negative electrodes and the separator;

wherein said positive electrode comprises a nickel oxide plus 1–15 wt. % cobalt oxide and 1–15 wt. % of conductive powder selected form the group consisting of Ni, Cu, C, Zn, Al, organic polymer, and combinations thereof;

wherein said hydride negative electrode comprises at least two or more hydrogen storage electrode alloys represented by the following formula:

$$E_aG_bNi_xD_yM_xR_z$$

where Ni is the element nickel; E is one or more elements selected from the group consisting of Ti, Zr, Mg, Ca, and rare earth metals; G is at least one element selected from the group consisting of Al, V, Mn, Nb, Hf, Ta, Si, and Pd; D is at least one element selected from the group consisting of Cr, Mn, Fe, Co, Cu, Zn, Mo, W and Sn; R is at least one element selected from the group consisting of C, B, Mg, Al, Ca, Sb, Bi, Sc, Y, Hf, Ta, N, O, Ge, and Ga; M is at least one element selected from the group consisting of Li, Na, K, Rb, Cs, P and S; where a, b, c, x, y and z are defined by: $0.10 \leq a \leq 0.85$, $0.01 \leq b \leq 0.65$, $0.06 \leq c \leq 0.80$, $0 \leq y \leq 0.30$, $0 \leq x \leq 0.30$, $0 \leq z \leq 0.30$, and $a+b+c+y+x+z=1.00$.

13. A hydride battery of claim 12, wherein said hydride negative electrode comprises two hydrogen storage electrode alloys selected from one of the following two sets:

(1) $Ti_{0.15}Cr_{0.10}Hf_{0.03}Nb_{0.45}Ni_{0.22}Mn_{0.05}$ and $Ti_{0.25}Zr_{0.17}Nb_{0.08}Hf_{0.01}Cr_{0.06}Ni_{0.39}Mn_{0.01}$, (2) $Ti_{0.20}Cr_{0.15}Hf_{0.05}V_{0.40}Ni_{0.20}$ and $Ti_{0.26}Zr_{0.15}Hf_{0.02}N_{0.09}Ni_{0.40}Cr_{0.06}Mn_{0.02}$.

14. A hydride battery, said battery comprises a container, a positive electrode, a hydride negative electrode, a separator positioned between the positive and negative electrodes, and electrolyte in the container and in contact with said positive and negative electrodes and said separator;

wherein said positive electrode comprises a nickel oxide plus 1–15 wt. % cobalt oxide and 1–15 wt. % of conductive powder selected from the group consisting of Ni, Cu, C, Zn, Al, organic polymer, and combinations thereof;

wherein said hydride negative electrode comprises at least two hydrogen storage electrode alloys selected from one or the combination of the following groups:

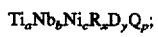

and its hydride thereof, where R is at least one element selected from the group consisting of B, Hf, Sc, Zn, Sb, W, Sn, N, O, Ge, Ga, P, S, and alkali metals; D is at least one element selected from the group consisting of Mn, Si, Cr, Fe, Co, Cu and rare earth metals; Q is at least one element selected from the group consisting of C, Mg, Ca, Sr, Ba, Al, Si, V, Zr, Nb, Mo, Pd, Ag, Y, Ta, La, Ce, and rare earth metals; and where the atomic mole ratios: a, b, c, x, y and p are defined by: $0.10 \leq a \leq 0.85$, $0.001 \leq b \leq 0.50$, $0.06 \leq c \leq 0.80$, $0 \leq x \leq 0.30$, $0 \leq y \leq 0.30$, $0 \leq p \leq 0.45$, and $a+b+c+x+y+p=1.00$.

* * * * *